H. HITCHCOCK.
Picture-Exhibitor.
No. 215,221.  Patented May 13, 1879.
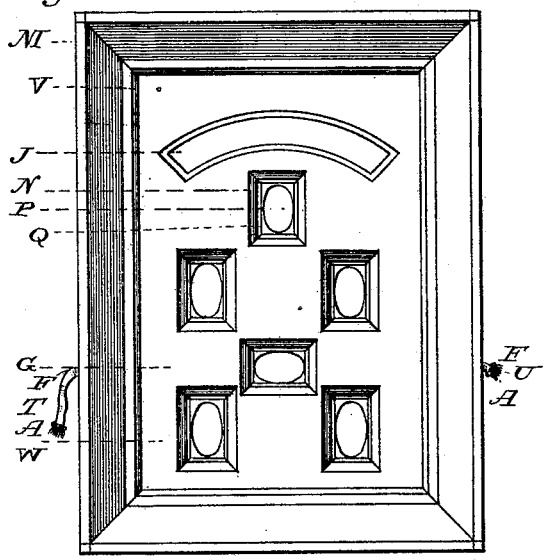
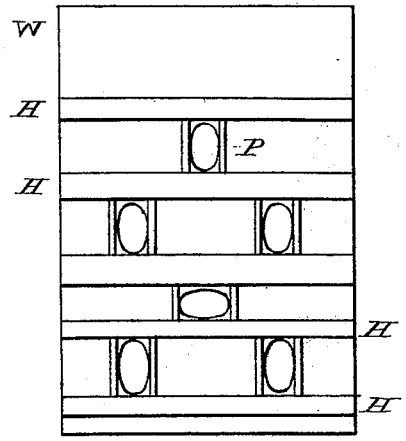
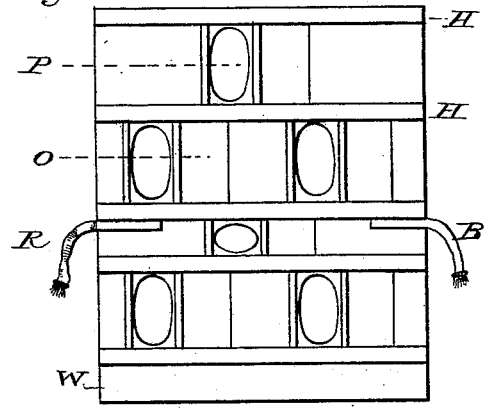
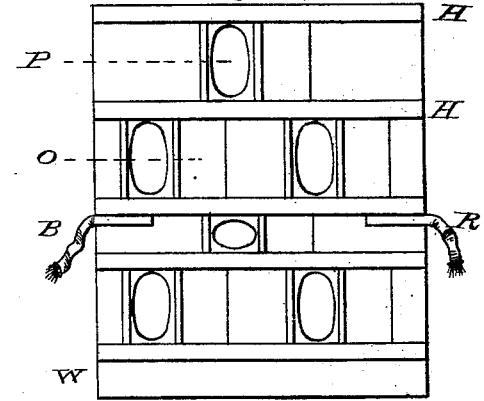
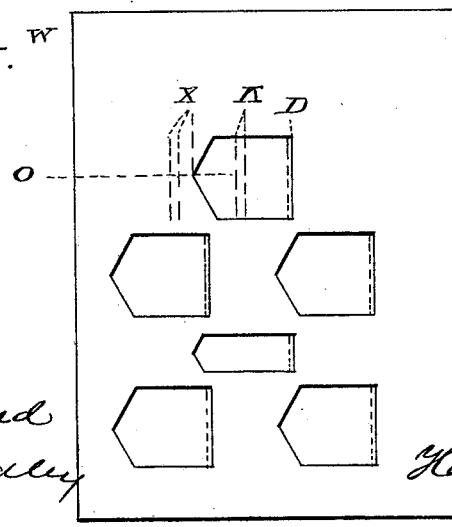
Witnesses:
E. M. Shepherd
C. W. Lindley
Inventor:
Henry Hitchcock

UNITED STATES PATENT OFFICE.

HENRY HITCHCOCK, OF MOUNT VERNON, ILLINOIS.

IMPROVEMENT IN PICTURE-EXHIBITORS.

Specification forming part of Letters Patent No. 215,221, dated May 13, 1879; application filed October 30, 1878.

*To all whom it may concern:*

Be it known that I, HENRY HITCHCOCK, of Mount Vernon, in the county of Jefferson and State of Illinois, have invented a useful Photograph or Picture Exhibitor, of which the following is a specification.

This invention is designed to display a large number of photographs or other pictures in a novel and attractive manner by means of peculiarly-constructed picture-holding slides, and while protected behind or under glass and in a picture-frame.

The object of my invention is to, first, have a picture-exhibitor that, while its pictures are protected from dust, &c., is always open, and a part of its contents always in view; second, to display a large number of pictures in a device of convenient and attractive form and of comparatively small size; third, to furnish an ever-entertaining puzzle; fourth, to furnish a picture cabinet or exhibitor that may be used as a useful ornament on the drawing-room table or parlor-wall; fifth, to furnish an attractive sample-picture exhibitor for photographers and a card-exhibiting device for advertisers.

My invention consists of one or more picture-holding slides, one stationary picture-holding card, and three or more partition or protecting cards, all arranged in an extra deep picture-frame behind a glass and photographer's picture-mat, the latter and the slides and the partition-cards having six or more openings in them, and the stationary card and the slides also, each, having six or more pictures, a hinged picture-frame back holding all in place in the frame and against the glass, the latter immovably fastened in the frame.

The accompanying drawings, in which similar letters of reference indicate like parts, show all the parts of my invention when constructed to hold and display eighteen photographs, six pictures being placed on the stationary card, and the same number of pictures on each slide.

Figure 1 represents a front view of my picture-exhibitor complete. M, frame, any style, but with extra deep rabbet and a hole in each side for the passage of the slide-moving tapes; J, rainbow scroll for motto; P, places for pictures to be seen on the stationary card through the mat-openings, the two slides with their pictures (six each) being drawn to the left side of the frame and into their first position, their six openings exactly registering with the six mat-openings, while the slide pictures are concealed under the mat at the left of each mat-opening; F F, holes in the sides of the frame through which pass the tapes attached to the slides; A A, tapes, red and blue, by which the slides are drawn to the right or left to move their pictures into or out of view; G, mat.

Fig. 2 represents the stationary card, with the first view of six pictures, to be seen through the openings in the mat and slides. H, picture-holders, made of strips of card-board, so glued across the card as to hold the pictures in position, the ends of the picture-mounts slipping under the holders.

Fig. 3 represents the first slide, with six places for pictures and six openings alongside, both places for pictures and openings registering with the openings in the mat; H, picture-holders; P, places for pictures; O, openings; R, red tape on the left; B, blue tape on the right side.

Fig. 4 represents the second slide, substantially like the first.

Fig. 5 represents the partition or protecting card, its openings registering with the mat and slide openings only as to their upper and lower edges, while their right edges are one-quarter of an inch farther to the right than the right edges of the mat and slide openings, thus allowing the right margins of the photographs to freely pass out of sight. The left side of each of the partition-card openings is made diamond-pointed that the left margins of the photographs may pass them without catching on said left side of the openings of said partition-cards.

The partition-cards unnumbered are placed between the mat and slides, between the slides themselves, and between the slides and the stationary card, and, besides enabling the slides to move singly and freely, also serve to protect the faces of the pictures when the slides are in motion.

To operate this invention, the slides all being in their first position, (against the left side of the frame, and the first view on the stationary card in sight,) pull, first, the short red tape on the right, which gives the second view; second, the short blue tape on the same side, which gives the third view; then, to restore the views, pull the tapes in the same order of colors on the left—first, red; second, blue.

What I claim as my invention is—

1. The picture-holding slide provided with places for pictures and corresponding openings alongside of the picture places, substantially as described.

2. The picture-exhibitor consisting of the frame, the stationary card, the partition-cards, and the picture-holding slides provided with openings, arranged as described.

HENRY HITCHCOCK.

Witnesses:
JAMES HITCHCOCK,
CHARLES W. LINDLEY.